United States Patent
Persson

(10) Patent No.: US 9,882,391 B2
(45) Date of Patent: Jan. 30, 2018

(54) FILTERING A STREAM OF POWER CONTROL COMMANDS

(75) Inventor: Magnus Persson, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 855 days.

(21) Appl. No.: 14/354,808

(22) PCT Filed: Nov. 28, 2011

(86) PCT No.: PCT/SE2011/051434
§ 371 (c)(1),
(2), (4) Date: Apr. 28, 2014

(87) PCT Pub. No.: WO2013/066226
PCT Pub. Date: May 10, 2013

(65) Prior Publication Data
US 2014/0288723 A1    Sep. 25, 2014

Related U.S. Application Data

(60) Provisional application No. 61/555,611, filed on Nov. 4, 2011.

(51) Int. Cl.
*H02J 4/00* (2006.01)
*H04W 52/22* (2009.01)
(Continued)

(52) U.S. Cl.
CPC .............. *H02J 4/00* (2013.01); *H04W 52/22* (2013.01); *H04W 52/221* (2013.01);
(Continued)

(58) Field of Classification Search
CPC ....... H02J 4/00; H04W 52/22; H04W 52/146; H04W 52/221; H04W 52/248; H04W 52/545
(Continued)

(56) References Cited

U.S. PATENT DOCUMENTS 5,924,043 A    7/1999    Takano
7,171,309 B2*  1/2007    Goodman ............... E21B 47/18
                                                166/250.1

FOREIGN PATENT DOCUMENTS

EP    0682417 A2 *  11/1995    .......... H04W 52/221
EP    1213850 A1    6/2002
(Continued)

OTHER PUBLICATIONS

Gunnarsson, F., et al., "Power Control with Time Delay Compensation," 52nd Vehicular Technology Conference, 2000. IEEE-VTS Fall VTC 2000. 2000. pp. 646-653. vol. 2. Boston, Massachusetts, US.

(Continued)

*Primary Examiner* — Ryan Coyer
(74) *Attorney, Agent, or Firm* — Patent Portfolio Builders, PLLC

(57) ABSTRACT

There is provided a device for filtering a stream of power control commands including power-up and power-down commands for uplink transmit power control in a wireless communication system. The device (100) includes a sequence tester (102) configured to determine whether a power-up command is immediately preceded by a sequence of consecutive power-up commands. The device also includes a command replacer (104) configured to replace, when it is determined that the power-up command is immediately preceded by a sequence of consecutive power-up commands, the power-up command with a power-down command.

17 Claims, 9 Drawing Sheets

(51) Int. Cl.
*G05D 3/12* (2006.01)
*H04W 52/54* (2009.01)
*H04W 52/14* (2009.01)
*H04W 52/24* (2009.01)

(52) U.S. Cl.
CPC ........ *H04W 52/545* (2013.01); *H04W 52/146* (2013.01); *H04W 52/248* (2013.01)

(58) Field of Classification Search
USPC .......................................................... 700/297
See application file for complete search history.

(56) References Cited

FOREIGN PATENT DOCUMENTS

| WO | WO 0076084 A1 * | 12/2000 | .......... H04W 52/362 |
|---|---|---|---|
| WO | 0103328 A1 | 1/2001 | |
| WO | 02054624 A1 | 7/2002 | |
| WO | 2005034380 A1 | 4/2005 | |
| WO | 2005114866 A1 | 12/2005 | |
| WO | WO 2005114866 A1 * | 12/2005 | .......... H04W 52/221 |
| WO | 2009061261 A2 | 5/2009 | |
| WO | 2010110127 A1 | 9/2010 | |

OTHER PUBLICATIONS

Third Generation Partnership Project, "3GPP TS 25.214 V9.7.0 (Sep. 2011)," 3rd Generation Partnership Project; Technical Specification Group Radio Access Network; Physical layer procedures (FDD) (Release 9). Sep. 2011. pp. 1-99.

Nishikawa, D., et al., "Investigation on Optimum Control Interval for Intra-cell Fractional TPC Using AMC for Shared Channel in Evolved UTRA Uplink," IEEE International Symposium on Wireless Communication Systems. 2008. ISWCS '08. Oct. 21-24, 2008. pp. 284-289. Reykjavik, Iceland.

Nasreddine, J., et al., "Adaptive Power Control Algorithm for 3G Cellular CDMA Networks," 2004 IEEE 59th Vehicular Technology Conference. VTC 2004—Spring. May 17-19, 2004. pp. 984-988. Milan, Italy.

\* cited by examiner

FILTERING A STREAM OF POWER CONTROL COMMANDS

TECHNICAL FIELD

The present technology relates to a method and device for filtering a stream of power control commands including power-up and power-down commands for uplink transmit power control in a wireless communication system as well as a method of uplink transmit power control, and a corresponding base station, user equipment and computer program product.

BACKGROUND

Transmit power control is of outmost importance in wireless communication systems.

In many communication systems so-called fast power control is employed for the uplink. Basically, as schematically illustrated in FIG. 1, this implies that a base station 10 measures the received channel quality, e.g. in terms of Signal-to-Interference Ratio, SIR, or Signal-to-Interference-plus-Noise Ratio, SINR, from each user equipment, UE, 20 and commands each UE to adjust its transmit power accordingly.

Fast power control is often referred to as Inner Loop Power Control, ILPC, and is commonly used, e.g. in wireless communication systems based on Code Division Multiple Access, CDMA, such as W-CDMA and CDMA2000.

A target for conventional ILPC is normally to ensure that the received SIR or SINR is at an appropriate level for each UE. If the received SIR or SINR is below target, i.e. too low for proper demodulation and/or decoding, the base station will normally command the UE to increase the UE transmit power. If the received SIR or SINR is above target, the base station commands the UE to decrease the UE transmit power. The SIR or SINR target is typically set by the so-called Outer Loop Power Control. Without power control in the system, the inter-user-interference would make it impossible for the base station to decode transmissions from some users.

According to standard specifications such as 3GPP TS 25.214, the UE's transmission power should basically be updated every slot based on a signal quality measurement performed by the radio base station. The base station therefore generates Transmit Power Control, TPC, commands for the UE based on signal quality estimates, where each TPC command normally indicates a step-size (e.g. 1 dB) transmit power increase/decrease. This is sometimes referred to as the base line TPC command generation. A TPC command indicating a transmit power increase (e.g. 1 dB) is normally referred to as a power-up command, and a TPC command indicating a transmit power decrease (e.g. 1 dB) is normally referred to as a power-down command.

However, when the system is close to its capacity, stability is reduced and so called power rushes can occur because one or several of the users can not reach their SIR or SINR targets. This is also referred to as the "party effect", where users tries to "talk" louder and louder as the general level of interference increases. This is a very significant problem in many systems such as WCDMA since the power control loops are very fast and capable of stepping up the UE power with up to 1500 dBs/second (1 dB step size 1500 times per second).

Experience also shows that conventional uplink power transmit control mechanisms often lead to fluctuations in SIR or SINR, which affect the Rise-over-Thermal noise (RoT). RoT is normally defined as the ratio between the total power received from all UEs on one hand and thermal noise on the other, and is often used as a measure to indicate "congestion" or "overload". In modern communication systems, such as WCDMA, the uplink may be non-orthogonal by design, and the capacity and coverage is limited by the maximum RoT. In scenarios with few users transmitting simultaneously, e.g. a few high-rate users or a few users operating in Time Division Multiplexing, TDM, fashion, the RoT level can change very rapidly often due to the SIR fluctuations of individual users.

There are attempts to limit SIR variations, e.g. in the standard specification 3GPP TS 25.214, but the often more important stability control is still an issue and strict control of maximum RoT is important.

The state-of-the-art solutions for uplink transmit power control do not provide optimal performance with respect to stability, capacity, and/or coverage.

SUMMARY

The present technology overcomes these and other drawbacks of the prior art arrangements.

It is a general object to provide improvements related to uplink transmit power control in a wireless communication system.

In particular, it is an object to provide a method of filtering a stream of power control commands including power-up and power-down commands for uplink transmit power control in a wireless communication system.

It is also an object to provide a method of uplink transmit power control.

It is another object to provide a device for filtering a stream of power control commands including power-up and power-down commands for uplink transmit power control in a wireless communication system.

It is yet another object to provide a base station comprising such a device for filtering a stream of power control commands.

Still another object is to provide user equipment comprising such a device for filtering a stream of power control commands.

It is also an object to provide a corresponding computer program product.

These and other objects are met by the invention as defined by the accompanying patent claims.

According to a first aspect, there is provided a method of filtering a stream of power control commands including power-up and power-down commands for uplink transmit power control in a wireless communication system. The method includes determining whether a power-up command is immediately preceded by a sequence of consecutive power-up commands. The method also includes replacing, when it is determined that the power-up command is immediately preceded by a sequence of consecutive power-up commands, the power-up command with a power-down command.

This solution can also be referred to as "forced-down". Experiments clearly show that the proposed forced-down solution unexpectedly boosts the performance substantially in terms of throughput, coverage, stability and/or battery time.

According to a second aspect, there is provided a method of uplink transmit power control, wherein uplink transmit power is controlled by a stream of power control commands including power-up and power-down commands controlling the transmit power of user equipment (UE), and the stream of power control commands is filtered according to the method of the first aspect.

According to a third aspect, there is provided a device for filtering a stream of power control commands including power-up and power-down commands for uplink transmit power control in a wireless communication system. The device includes a sequence tester configured to determine whether a power-up command is immediately preceded by a sequence of consecutive power-up commands. The device also includes a command replacer configured to replace, when it is determined that the power-up command is immediately preceded by a sequence of consecutive power-up commands, the power-up command with a power-down command.

According to a fourth aspect, there is provided a base station comprising a device for filtering a stream of power control commands according to the third aspect.

According to a fifth aspect, there is provided user equipment comprising a device for filtering a stream of power control commands according to the third aspect.

According to a sixth aspect, there is provided a computer program product comprising a non-transitory computer readable medium having stored therein a set of instructions for performing, when executed by a computer-based system, the method according to the first or second aspect.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
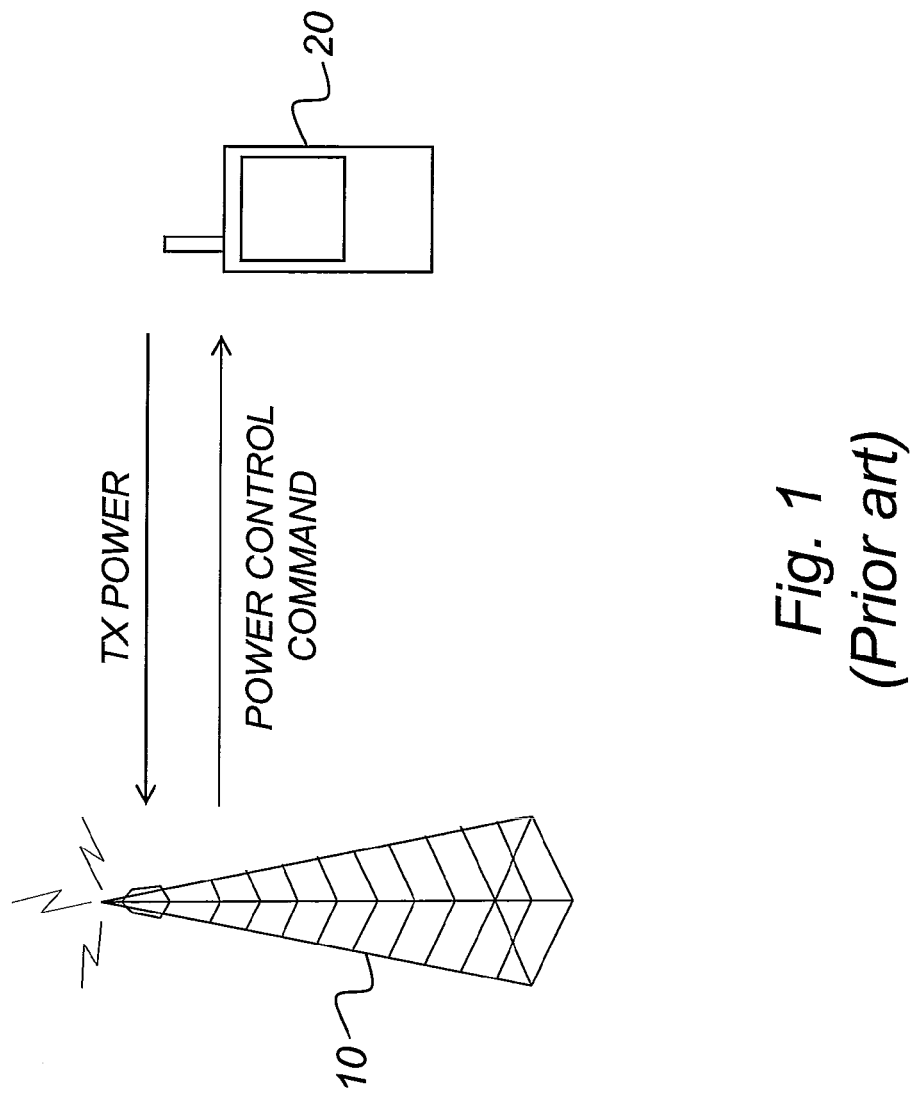
FIG. 1 is a schematic diagram that illustrates the basic principles of uplink transmit power control in a wireless communication system.

Throughout the drawings, the same reference characters will be used for corresponding or similar elements.

Figure 2:
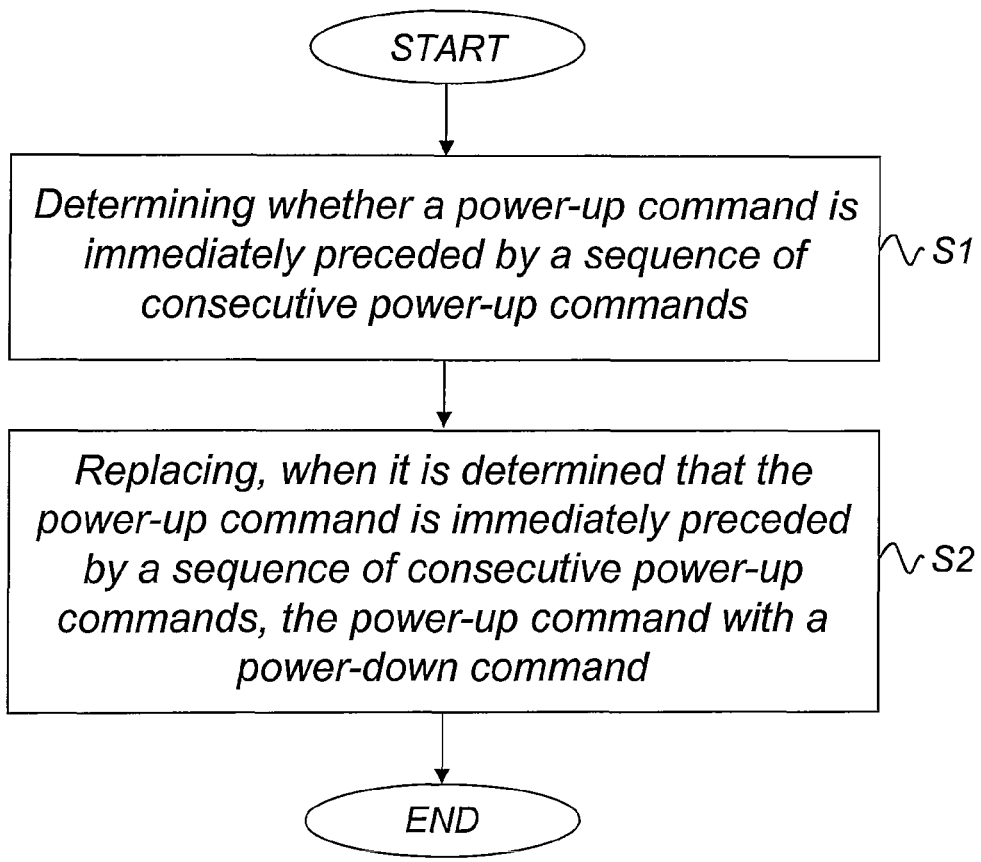
FIG. 2 is a schematic flow diagram illustrating an example of a method of filtering a stream of power control commands for uplink transmit power control.

FIG. 2 is a schematic flow diagram illustrating an example of a method of filtering a stream of power control commands including power-up and power-down commands for uplink transmit power control. The method includes determining, in step S1, whether a power-up command is immediately preceded by a sequence of consecutive power-up commands. The method also includes replacing, when it is determined that the power-up command is immediately preceded by a sequence of consecutive power-up commands, the power-up command with a power-down command in step S2.

In other words, when it has been determined in step S1 that the considered power-up command is immediately preceded by a sequence of consecutive power-up commands, this power-up command is replaced in step S2 with a power-down command.

This solution can also be referred to as "forced-down". Experiments clearly show that the proposed forced-down solution unexpectedly boosts the performance substantially in terms of throughput, coverage, stability and/or battery time.

Preferably, the considered power-up command is replaced with a power-down command when the power-up command is immediately preceded by a sequence of a predetermined number N of consecutive power-up commands, where N is an integer equal to or greater than 2. By way of example, it has turned out to be quite useful to set N to be equal to 2, although the method is not limited thereto. This practically means that a power-up command that is immediately preceded by just a single power-up command, i.e. not a sequence of consecutive power-up commands, is normally maintained.

In a particularly beneficial embodiment, the overall method of filtering includes maintaining a power-down command that is immediately preceded by a sequence of consecutive power-down commands, where the sequence of consecutive power-down commands is at least as long as the sequence of consecutive power-up commands. In other words, this means that the filtering is asymmetric by limiting the length of sequences of consecutive power-up commands while enabling longer resulting sequences of consecutive power-down commands.

In other words, it is possible to maintain a power-down command that is immediately preceded by a sequence of M consecutive power-down commands, where M is equal to or greater than N. In this way, the length of sequences of consecutive power-up commands is limited to N while enabling longer resulting sequences of M+1 consecutive power-down commands.

For example, the length M of the sequence of consecutive power-down commands may have an unlimited upper bound, thus allowing sequences of consecutive power-down commands of unlimited length.

As already mentioned, the power control commands, in general, and the power-up and power-down commands, in particular, may be transmit power control (TPC) commands for uplink transmit power control. As an example, the length N of the sequence of consecutive power-up commands can be made dependent on TPC delay.

Also, the power control commands including power-up and power-down commands are normally intended for controlling the transmit power of user equipment (UE) at Inner Loop Power Control (ILPC).

The filtering described herein may for example be performed by a base station or user equipment (UE).

The present technology also relates to the overall method of uplink transmit power control, wherein uplink transmit power is controlled by a stream of power control commands including power-up and power-down commands controlling the transmit power of user equipment (UE). The stream of power control commands is preferably filtered according to the method described herein.

Figure 3:
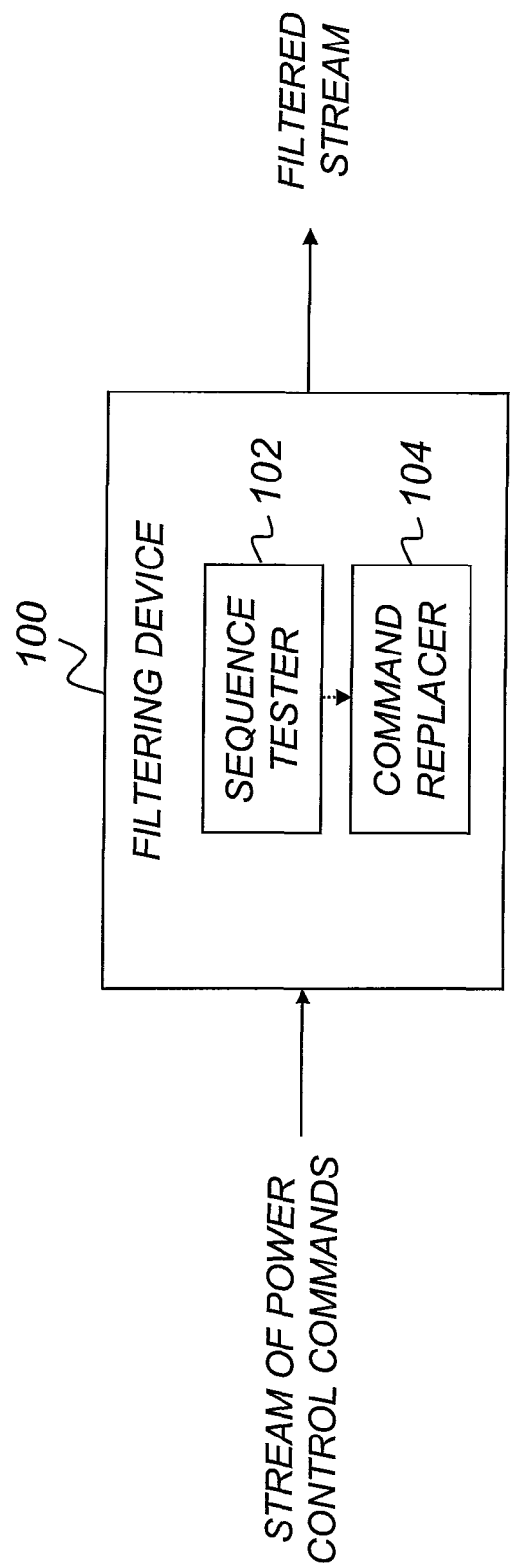
FIG. 3 is a schematic block diagram illustrating an example of a device for filtering a stream of power control commands for uplink transmit power control.

FIG. 3 is a schematic block diagram illustrating an example of a device for filtering a stream of power control commands including power-up and power-down commands for uplink transmit power control. The device 100 is thus configured to receive a stream of power control commands including at least power-up and power-down commands, and output a filtered stream of power control commands. The device 100 basically includes a sequence tester 102 and a command replacer 104. The sequence tester 102 is configured to determine whether a power-up command is immediately preceded by a sequence of consecutive power-up commands. The command replacer 104 is configured to replace, when it is determined that the power-up command is immediately preceded by a sequence of consecutive power-up commands, the power-up command with a power-down command.

In other words, if the sequence tester 102 determines that a power-up command is immediately preceded by a sequence of consecutive power-up commands, it may signal this to the command replacer 104, which may then perform the actual replacement of the considered power-up command with a power-down command.

By way of example, the sequence tester 102 may include a buffer for storing a number of previous power control commands. In this way, the sequence tester 102 can analyze a stored sequence of previous power control commands to enable detection of a sequence of consecutive power-up commands.

The command replacer 104 is preferably configured to replace the power-up command with a power-down command when the power-up command is immediately preceded by a sequence of a predetermined number N of consecutive power-up commands, where N is an integer equal to or greater than 2.

In a particularly useful embodiment, the filtering device is configured to maintain a power-down command that is immediately preceded by a sequence of consecutive power-down commands, where the sequence of consecutive power-down commands is at least as long as the sequence of consecutive power-up commands. The filtering device is thus an asymmetric filter configured to limit the length of sequences of consecutive power-up commands while enabling longer resulting sequences of consecutive power-down commands.

Figure 7:
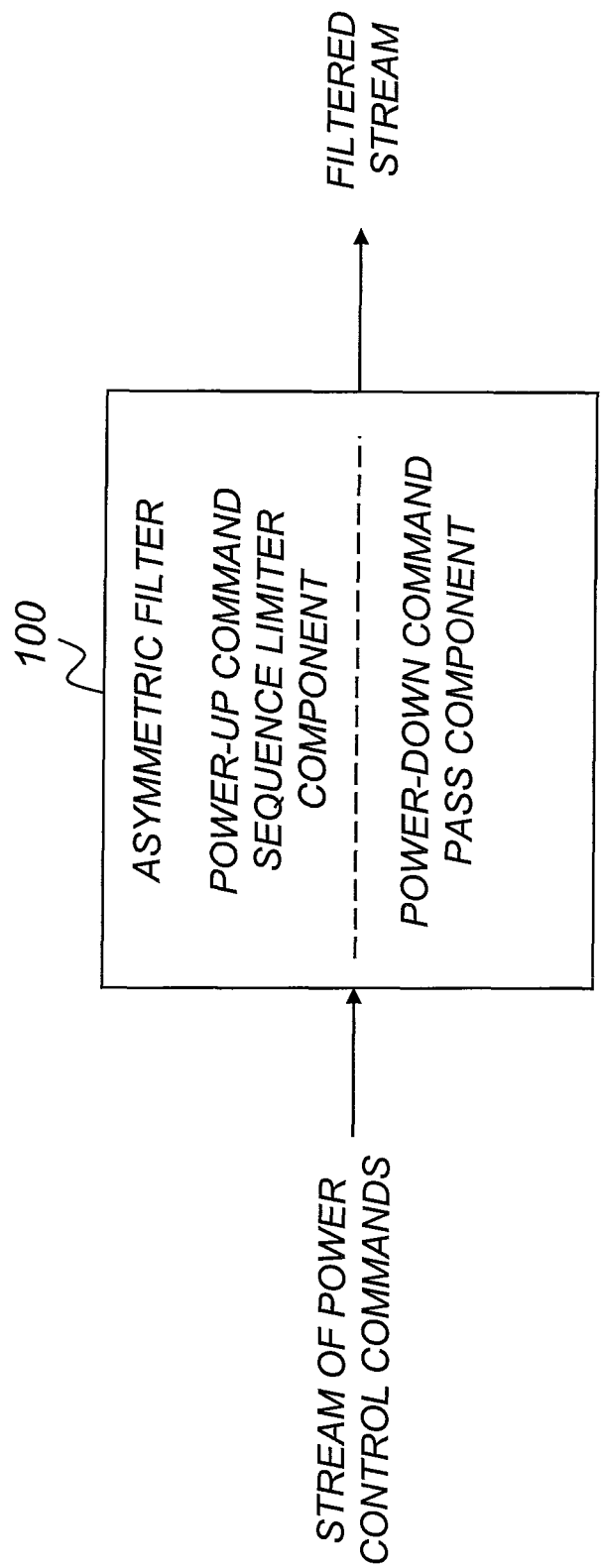
FIG. 7 is a schematic diagram illustrating an example of a filtering device implemented as an asymmetric filter.

Preferably, the overall asymmetric filter 100 is configured to operate as a power-up command sequence limiter in combination with a power-down command pass filter component, as schematically illustrated in FIG. 7. By way of example, the power-up command sequence limiter is operative to limit the length of sequences of consecutive power-up commands, while the power-down command pass filter component is operative to let longer or even unlimited sequences of consecutive power-down commands through the filter.

Typically, the power control commands including power-up and power-down commands are transmit power control (TPC) commands for uplink transmit power control. The power control commands including power-up and power-down commands typically control the transmit power of user equipment (UE) at Inner Loop Power Control (ILPC).

Preferably, the sequence tester 102 is configured to test each of a number of power-up commands in the stream of power control commands, and instruct the command replacer 104 to replace the currently considered power-up command with a power-down command provided that the power-up command is immediately preceded by a sequence of consecutive power-up commands. Advantageously, all or at least a majority of the power-up commands in the considered stream of power control commands are processed and tested for selective replacement.

Figure 4:
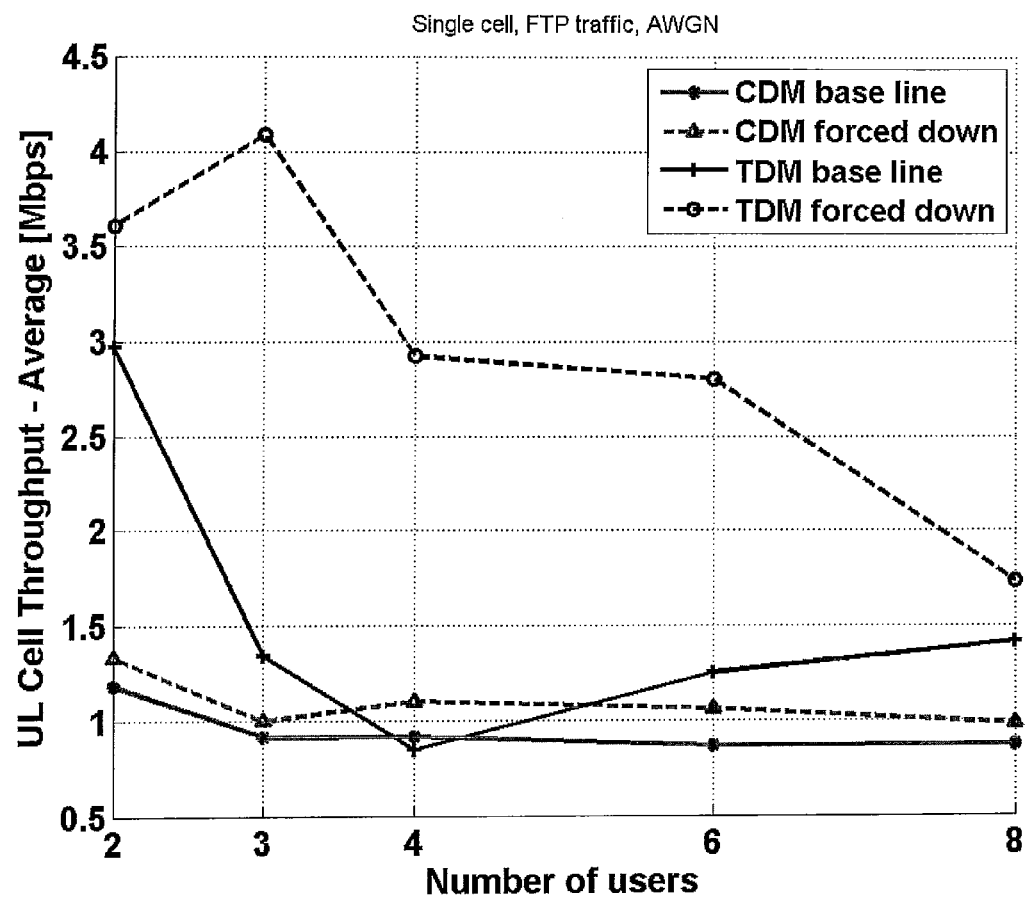
FIG. 4 is a schematic diagram illustrating an example of uplink cell throughput curves for the conventional base line solution and the proposed forced down solution of the present technology.

FIG. 4 is a schematic diagram illustrating an example of uplink cell throughput curves for the conventional base line solution and the proposed forced down solution of the present technology.

The throughput performance of the proposed forced-down filtering is tested for a WCDMA system using a Code Division Multiplexing, CDM, component and a Time Division Multiplexing, TDM, component, respectively, and compared to the conventional base line TPC command generation for CDM and TDM. TDM is also sometimes referred to as TD scheduling.

For TDM forced down, the performance gain compared to TDM base line is astonishing. A performance gain of up to several hundred percent can be achieved. For example the uplink cell throughput goes from about 0.75 Mbps for TDM base line to nearly 3 Mbps for TDM forced down when the number of users is 4, i.e. an improvement of more than 300%.

For CDM forced down, the performance gain compared to CDM base line is not as high, but CDM forced down still consistently produces a 15-30% gain.

The present technology may also reduce the inherent system instability present in non-orthogonal uplink designs, e.g. in WCDMA/EUL systems. The present technology may reduce the average SIR (SIR target), which means increased coverage and improved battery time.

The present technology may also boost the performance gains in combination with other Radio Resource Management features, such as uplink congestion control.

A possible disadvantage is a small increase of the retransmission rate, but this is a small price to pay for the significant improvements in user and cell throughput, coverage, and stability.

The invention has turned out to be particularly useful in applications with fast interference variations such as for bursty traffic and/or CDMA systems utilizing a TDM component.

The filtering device describe above can be implemented in a radio base station or UE, such as the radio base station 10 or the UE 20 illustrated in FIG. 1.

In the following, particular examples of implementations of the proposed filtering device in a base station and UE will now be described with reference to FIGS. 5 and 6.

Figure 5:
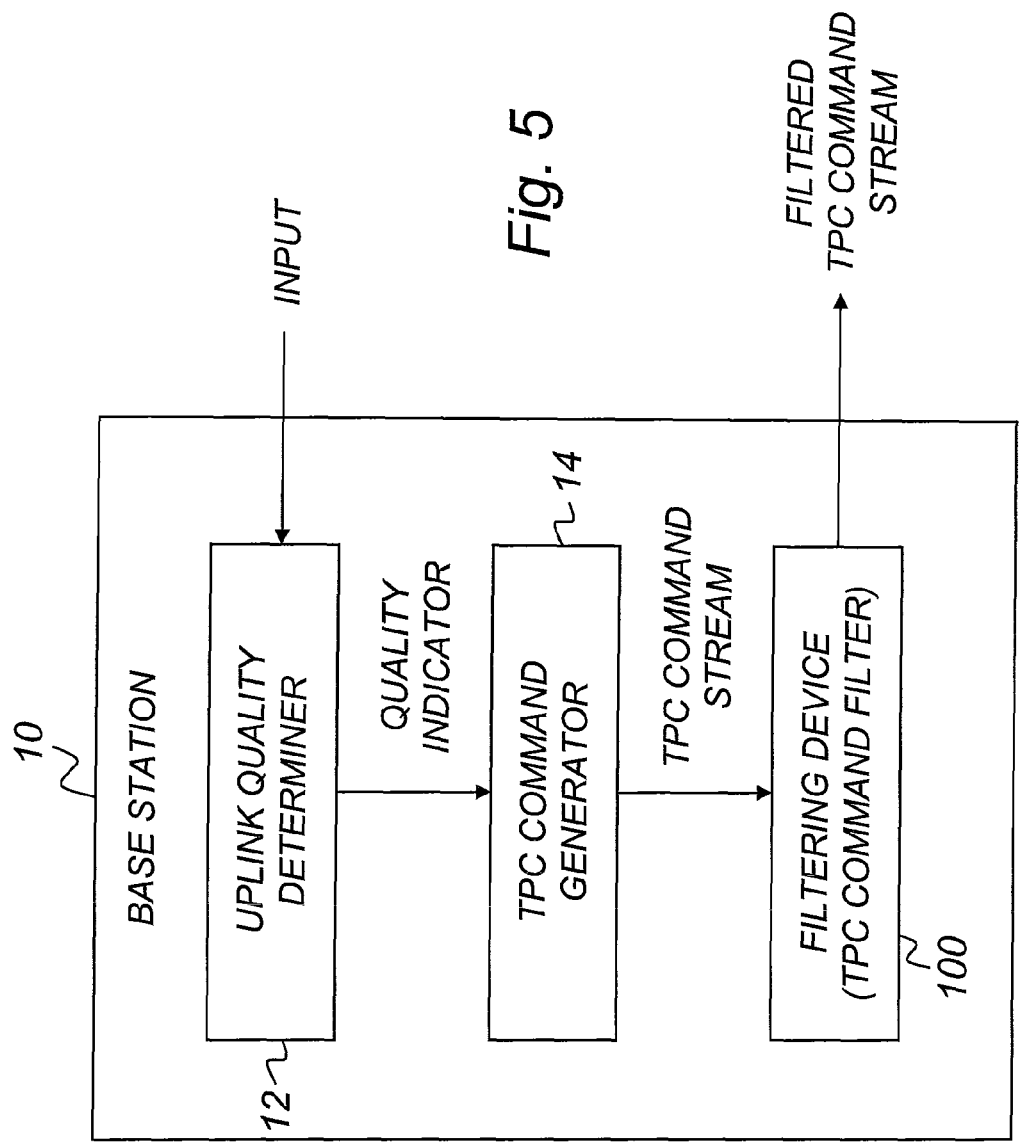
FIG. 5 is a schematic block diagram illustrating a particular example of a base station comprising a filtering device.

FIG. 5 is a schematic block diagram illustrating a particular example of a base station comprising a filtering device. In this example, the base station 10, such as a Node B or eNodeB, includes an uplink quality determiner 12, a TPC command generator 14 and a filtering device 100.

The uplink quality determiner 12 typically estimates the uplink quality, for each slot, and provides a corresponding quality indicator, or alternatively receives channel quality information as input and establishes the quality indicator based on the received channel quality information. In the former case, the input is typically a received pilot signal, which is used to estimate the channel signal quality. An example of a suitable quality measure is received signal quality such as SIR or SINR, but any other feasible quality measure can be used.

The TPC command generator 14 receives the quality indicator, and is typically configured to generate a TPC command, each slot, by comparing the measured uplink quality with a target value. For example, the TPC command generator 14 may operate according to a conventional base line TPC command algorithm. Over time, the TPC command generator 14 provides a TPC command stream including at least power-up and power-down commands.

The filtering device 100 is configured to receive the TPC command stream from the TPC command generator 14, and effectively operates as a TPC command filter to provide a filtered TPC command stream as output.

Figure 6:
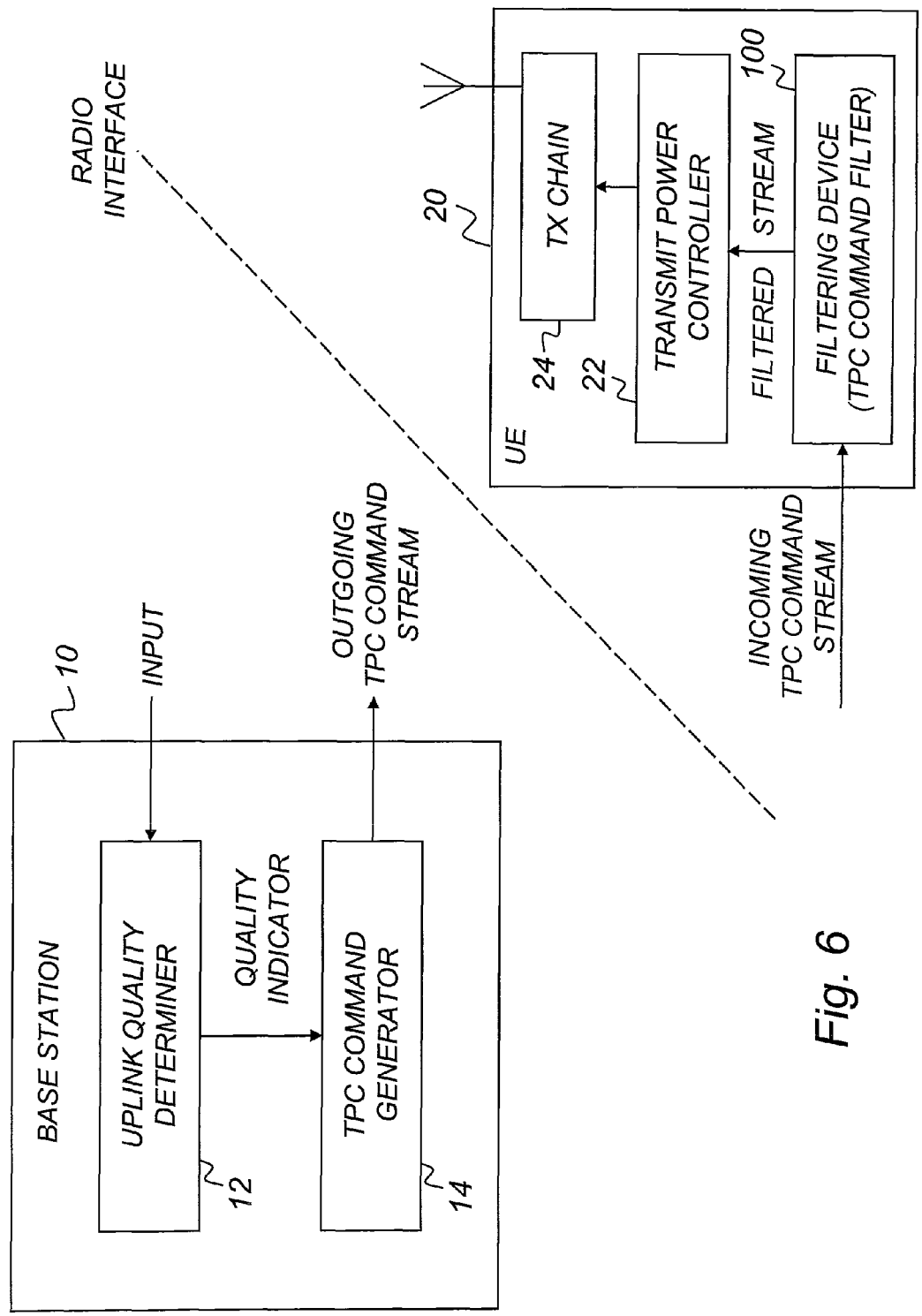
FIG. 6 is a schematic block diagram illustrating an example of a base station on one side, and a particular example of user equipment comprising a filtering device on the other side.

FIG. 6 is a schematic block diagram illustrating an example of a base station on one side, and a particular example of user equipment comprising a filtering device on the other side. In this example, the base station 10 includes an uplink quality determiner 12, and a TPC command generator 14. The uplink quality determiner 12 and the TPC command generator 14 are similar to those described in connection with the base station of FIG. 5, and the base station produces an outgoing TPC command stream. However, in the example of FIG. 6, the filtering device 100 is implemented in the UE rather than in the base station.

The UE 20 basically includes a filtering device 100, a transmit power controller 24 and a transmission, TX, chain 24 connected to one or more antennas. The filtering device 100 is configured to receive the TPC command stream from the base station 10 and perform the proposed filtering of TPC commands in order to provide a filtered TPC command stream. The transmit power controller 22 is configured to receive the filtered TPC command stream to control the transmit power of the UE 20 accordingly. More specifically, the transmit power controller 22 provides suitable control signaling to the TX chain 24, and the power amplifier of the TX chain to thereby control the uplink transmit power of the UE.

It may be useful to continue with a brief overview and analysis of the prior art solutions with respect to uplink transmit power control.

For example, the specification 3GPP TS 25.214 describes two different algorithms for processing the so-called Transmit Power Control, TPC, commands.

In algorithm 1 (3GPP TS 25.214 section 5.1.2.2.2) every TPC command is handled individually resulting in a 1 dB UE transmit power increase/decrease every slot. This corresponds to the base line TPC command generation.

The Inner Loop Power Control is used by the base station to control the transmit power of each UE belonging to its cells. With the base line algorithm, a TPC command is sent every slot (1500 Hz) with two possible values: −1 dB and +1 dB. At reception of such command, the UE will increase or decrease its transmit power. But due to processing delay mainly, it takes a number of slots, usually 2 to 3 slots, from the transmission to the execution of a TPC command; the so-called TPC delay.

The base line algorithm typically generates a TPC command by comparing the measured uplink SIR (in dB) on the DPCCH channel with the SIR target (in dB) according to the following:

If SIR_dB>SIRtarget_dB→TPC=+1 Else TPC=−1.

In algorithm 2 (3GPP TS 25.214 Section 5.1.2.2.3) five consecutive TPC commands must be recognized as "power-up" to increase the transmit power by 1 dB, or five consecutive TPC commands must be recognized as "power-down" to reduce the transmit power by 1 dB. Otherwise the transmit power is not changed. Algorithm 2 may reduce SIR/SINR variations, but stability may be an issue and strict control of maximum RoT becomes very important.

The conventional algorithm 1 suits normal speech quite well if the UEs are transmitting on power levels well below the thermal noise, but with the introduction of Enhanced Uplink, EUL, UEs transmitting with high data rate on uplink, the power level from individual UEs might reach above the thermal noise and interfere with other UEs transmitting in the system. In a multi-UE scenario it is in most cases more important to avoid creating interference to other UEs than to combat own channel variations.

For short Transmission Time Intervals, TTIs, the so-called TPC delay can cause algorithm 1 to over-control the system as the response time of the system due to the TPC delay is comparable to or even longer than the TTI. The negative impact on the system/UE performance is larger for a larger TPC delay, which is especially essential for some advanced receivers such as Serial Interference Cancellation, SIC, or Parallel Interference Cancellation, PIC, receivers.

TPC delay may be defined as the time duration from the uplink slot, based on which a TPC command is generated, to the uplink slot in which the generated TPC command actually controls or affects the power with which the UE transmits. The TPC delay will typically depend on the processing time needed for channel quality (e.g. SINR) estimation, UL/DL timing, and propagation distance between UE and RBS. With future advanced receivers such as interference cancellation receivers the processing time may be even higher and thus the TPC delay may be as high as 8 or more slots.

The conventional algorithm 2 above is very slow and has problems to follow a fading channel and quite sensitive to SINR estimation errors. For instance, the user has high risk to suffer radio link failure in case of sudden uplink quality degradation with algorithm 2.

The basic idea with the conventional ILPC is to combat own channel variations and keep the signal quality on a pre-defined target level.

For example, UEs of the WCDMA uplink are subject to fast ILPC. The power control loops steer the powers of the UEs, so as to achieve the SIR or SINR targets set for the UEs. This in turn means that all power control loops are coupled nonlinearly, via the SIR or SINR measurement. It is well established in the literature that the loops stay stable as long as the uplink is operating below the pole capacity of the cell. However, when the system is close to the pole capacity, stability is reduced and so called power rushes can occur because one or several of users can not reach their targets. This is also referred to as the "party effect", where users tries to "talk" louder and louder as the general level of interference increases. This is a very significant problem in WCDMA since the power control loops are very fast and capable of stepping up the UE power with up to 1500 dB/second. The restriction of the TPC commands to indicate only an increase or decrease of the transmit power, since a TPC command typically includes a single control bit in accordance with the 3GPP specifications, makes the assignment critical.

The inventor has recognized that the objective to allow all users to reach their target level is not always feasible, and a careful analysis indeed shows that conventional ILPC in many cases may lead to stability problems and power rushes.

The inventor therefore proposes a method for filtering the stream of power control commands including power-up and power-down commands in which it is determined whether a power-up command is immediately preceded by a sequence of N consecutive power-up commands, where N is an integer equal to or greater than 2, and when the considered power-up command is in fact immediately preceded by a sequence of N consecutive power-up commands, the power-up command is replaced with, or forced into, a power-down command.

As previously mentioned, this solution is also referred to as forced-down, in clear contrast to the current state-of-the-art solution of algorithm 2 that actually increases the transmit power in response to a number of consecutive power-up commands.

WO 02/054624 relates to a method and system of transmission power control. When the distance between the mobile and the base station is larger than the one-slot distance, the power control loop delay will be larger than the duration of one slot. If the loop delay is larger than one slot and a TPC command needs to be transmitted within one slot, the command will be transmitted before the actual estimation of the channel quality has been completed. The solution in WO 02/054624 proposes transmitting a TPC command based upon a latest earlier measurement, not yet made use of, if available, and if not available, transmitting a TPC command identical to a most recently transmitted TPC command at its first occurrence and transmitting a TPC command corresponding to an inversion of a most recently transmitted TPC command at later occurrences. If no measurement, upon which no previous TPC command is based, is available in a first occurrence, the previous TPC command is repeated. If no measurement data is available in a later occurrence, the previous TPC command is inverted. The repetition in the first instance followed by the inversion in the second instance provides a form of command toggling. This prior art solution might be quite satisfactory, but operates in a different way based on a different criteria. This solution does not determine whether the present power control command is immediately preceded by a sequence of consecutive power-up commands, nor does it replace a power-up command with a power-down command under the condition that the present command is immediately preceded by a sequence of consecutive power-up commands.

WO 2009/061261 mainly concerns outer loop power control for the uplink in a wireless communication system, but also mentions inner loop power control where alternating TPC commands, up-down, up-down, are sent to the mobiles, i.e. so-called TPC command toggling, in order to handle instability situations.

Moreover, if there are several UEs contributing to the power rush in an instability situation, the TPC commands up-down up-down signaled to the various UEs should be staggered as far as possible so that approximately half the UEs receive an "up" command and the other half receive a "down" command at each instance. Alternatively, there may be a limited output power increase operation, where the base station sends specific TPC command patterns to the UE, both considering the variations in radio link quality and limited output power increase conditions. The limited output power increase operation restricts the number of power adjustments upwards relative the total number of power control commands over a given period. For example, the maximum number of "up" commands per e.g. 30 commands could be restricted to less than half of the considered commands, so as to effectuate a general output power reduction that could further help to resolve a congestion situation.

WO 2005/034380 also relates to transmission power control, but focuses more on limiting SIR oscillations. A TPC command is generated based on a latest available earlier measurement adjusting for excessive oscillating variability by a quasi-periodic correcting signal with a cycle time corresponding to half the TPC control delay. Oscillation is normally detected by frequency analysis, and a compensation signal is injected to the uncompensated transmission power control signal.

U.S. Pat. No. 5,924,043 relates to the control of transmission power in a cellular mobile communication system. In a particular embodiment, sudden and sharp movements of channel power are detected based upon TPC bits in a predetermined pattern. If such a sudden movement in channel power is detected, the transmission power of the mobile unit is controlled to be leveled off to an average or mean value, preferably calculated over hundreds of previous TPC bits.

As a supplement to the above description, additional examples of implementations of a filtering device of the present technology will be described in the following.

Figure 8:
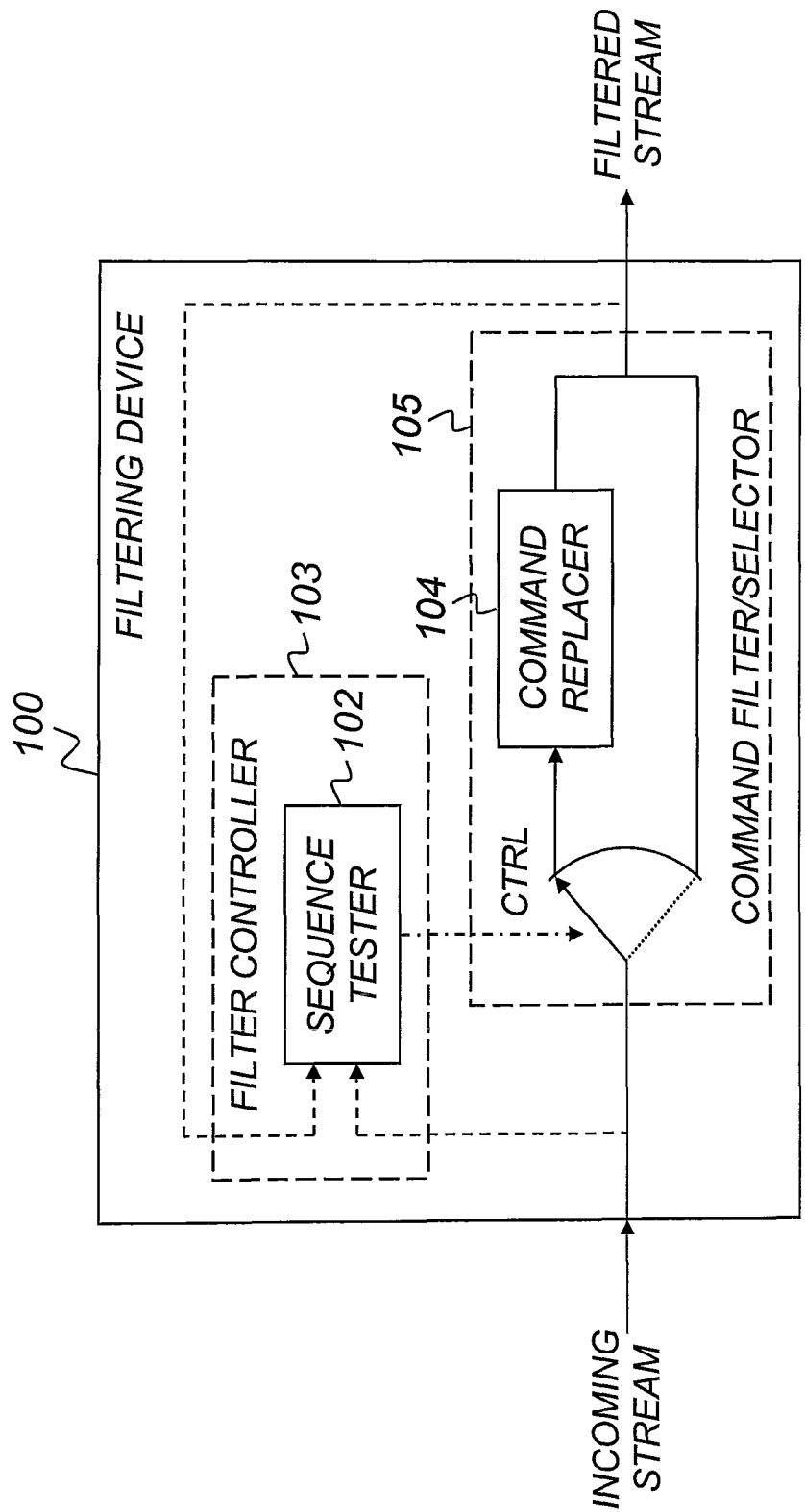
FIG. 8 is a schematic block diagram illustrating a particular example of a device for filtering a stream of power control commands for uplink transmit power control.

FIG. 8 is a schematic block diagram illustrating a particular example of a device for filtering a stream of power control commands including power-up and power-down commands for uplink transmit power control. In this particular example, the sequence tester 102 constitutes or forms part of a filter controller 103, and the command replacer 104 constitutes or forms part a command filter or selector 105. The sequence tester 102 is configured to receive the incoming and/or outgoing stream of power control commands including power-up and power-down commands and may determine whether a considered power-up command is immediately preceded by a sequence of consecutive power-up commands. By way of example, the sequence tester 102 may then provide suitable control signaling, CTRL, to the command filter/selector 105 to selectively engage the command replacer 104. In this way, the command replacer 104 can replace the considered power-up command with a power-down command when the power-up command is indeed immediately preceded by a sequence of consecutive power-up commands. The command filter or selector 105 is thus configured to selectively perform the replacement of the considered power-up command with a power-down command based on the analysis of the sequence tester 102. By way of example, the sequence tester 102 may include a storage buffer (not shown) for storing a number of previous power control commands so that the sequence tester 102 may determine whether the currently considered power-up command is immediately preceded by a sequence of consecutive power-up commands. Preferably, the storage buffer is continuously updated, and if a power-up command is replaced by a power-down command by the command replacer, the resulting power-down command is typically stored in the storage buffer instead of the original power-up command. The command replacer 104 may for example be a bit inverter, if the power control command is represented by a single control bit.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits.

Many aspects of the present technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented, such as a base station and/or UE. It may also be possible to re-use existing software, e.g. by reprogramming of the existing software or by adding new software components.

In the following, an example of a computer-implementation of the filtering device will be described with reference to FIG. 9.

Figure 9:
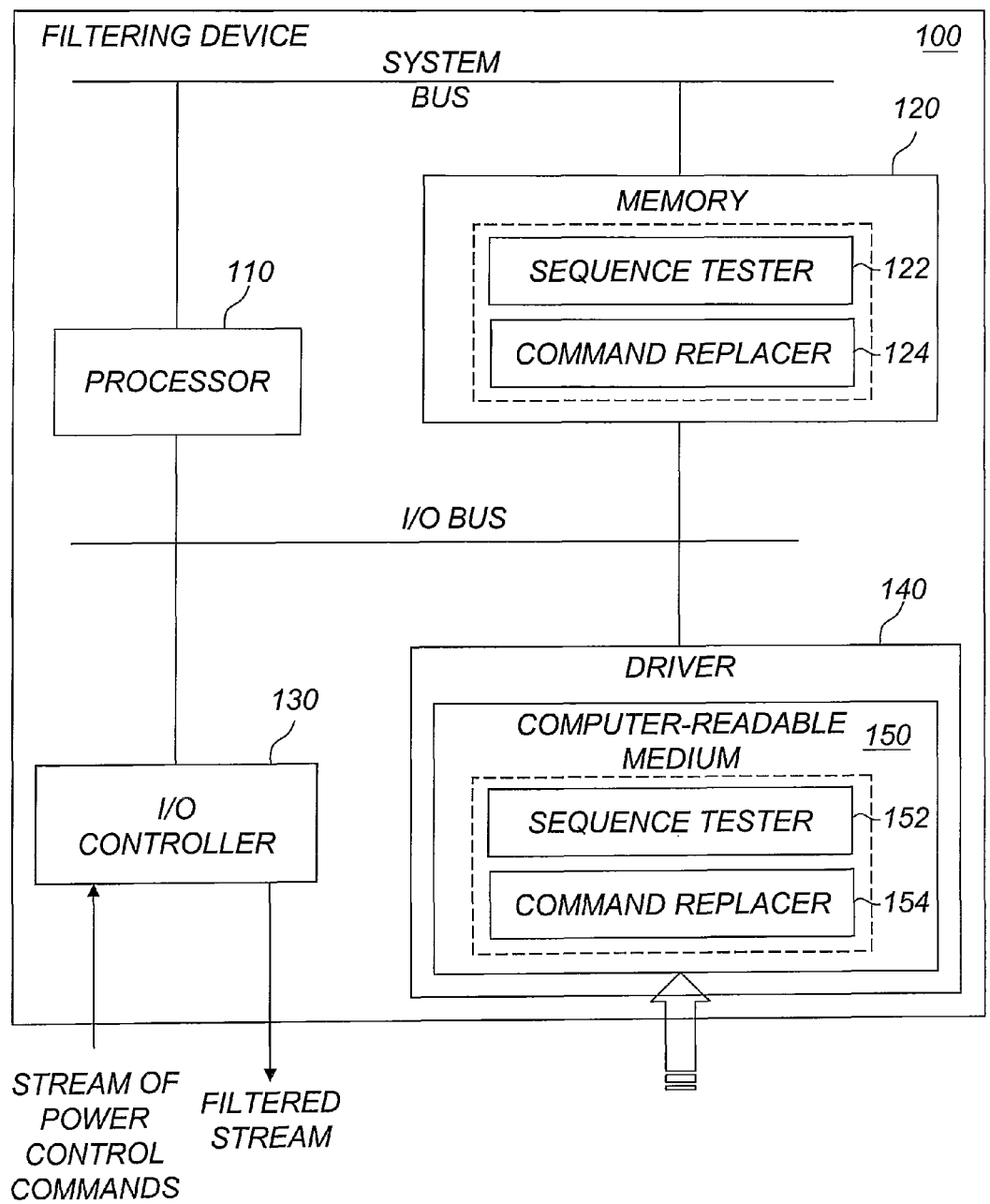
FIG. 9 is a schematic block diagram illustrating an example of a computer-implementation of a device for filtering a stream of power control commands for uplink transmit power control.

FIG. 9 is a schematic block diagram illustrating an example of a computer-implementation of a filtering device according to an embodiment. The filtering device 100 of this embodiment is based on a processor 110 such as a microprocessor or digital signal processor, a memory 120, an input/output (I/O) 130 and an optional driver 140 for a computer-readable medium 150.

In this particular example, at least some of the steps, functions and/or blocks described above are implemented in software, which is loaded into memory 120 for execution by the processor 110. The processor 110 and the memory 120 are interconnected to each other via a system bus to enable normal software execution. The I/O controller 130 may be interconnected to the processor 110 and/or memory 120 via an I/O bus to enable input and/or output of relevant data such as input parameter(s) and/or resulting output parameter(s).

In this particular example, the memory 120 includes a number of software components 122, 124 for implementing the functionality of the embodiments described above including steps, functions, procedures and/or blocks. In particular, software component 122 includes software for a sequence tester, and software component 124 includes software for a command replacer.

More particularly, the I/O controller 130 may more or less continuously receive a stream of power control commands. The received information representative of the stream of power control commands can continually be transferred to the processor 110 and/or memory 120 for use as input during execution of the software to perform the proposed filtering. The resulting filtered stream of power control commands may be transferred as output via the I/O controller 130.

If there is additional software that needs the resulting filtered stream of power control commands as input, the filtered stream of power control commands can be retrieved directly from memory 120.

Moreover, the present technology can additionally be considered to be embodied within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

By way of example, consider an example of "pseudo-code" for filtering a stream of power control commands including power-up and power-down commands for uplink transmit power control:

FOR each power control command, determine whether the command is a power-up command.

IF the command is a power-up command (YES), determine whether the power-up command is immediately preceded by a sequence of consecutive power-up commands.

IF so (YES) replace the power-up command with a power-down command.

CONTINUE with the next power control command.

The software, here exemplified in the form of software components 152, 154, may then be realized as a computer program product, which is normally carried on a non-transitory computer-readable medium 150, for example a CD, DVD, USB memory, hard drive or any other conventional memory device. The software may thus be loaded into the memory 120 of the filtering device or equivalent computer or processing system for execution by the processor 110.

The computer/processor/controller does not have to be dedicated to execute only the above-described steps, functions, procedure and/or blocks, but may also execute other software tasks.

The embodiments described above are merely given as examples, and it should be understood that the present invention is not limited thereto. Further modifications, changes and improvements which retain the basic underlying principles disclosed and claimed herein are within the scope of the invention.

The invention claimed is:

1. A method of filtering a stream of power control commands including power-up and power-down commands for uplink transmit power control in a wireless communication system, including:
   determining whether a power-up command is immediately preceded by a sequence of consecutive power-up commands;
   replacing, when it is determined that said power-up command is immediately preceded by a sequence of consecutive power-up commands, said power-up command with a power-down command;
   maintaining a power-down command that is immediately preceded by a sequence of consecutive power-down commands, where said sequence of consecutive power-down commands is at least as long as said sequence of consecutive power-up commands; and
   wherein said filtering is asymmetric by limiting the length of sequences of consecutive power-up commands while enabling longer resulting sequences of consecutive power-down commands.

2. The method of claim 1, wherein the sequence of consecutive power-up commands is a sequence of a predetermined number N of consecutive power-up commands, where N is an integer equal to or greater than 2.

3. The method of claim 1, wherein the sequence of consecutive power-up commands is a sequence of a predetermined number N of consecutive power-up commands, where N is equal to 2.

4. The method of claim 1, wherein the length of said sequence of consecutive power-down commands has an unlimited upper bound.

5. The method of claim 1, wherein the power control commands including power-up and power-down commands are transmit power control, TPC, commands for uplink transmit power control.

6. The method of claim 5, wherein the length of said sequence of consecutive power-up commands is dependent on a TPC delay.

7. The method of claim 1, wherein the power control commands including power-up and power-down commands are intended for controlling the transmit power of user equipment, UE, for Inner Loop Power Control, ILPC.

8. The method of claim 1, wherein said filtering is performed by a base station or a user equipment, UE.

9. A device for filtering a stream of power control commands including power-up and power-down commands for uplink transmit power control in a wireless communication system, wherein said device includes:
 a sequence tester configured to determine whether a power-up command is immediately preceded by a sequence of consecutive power-up commands;
 a command replacer configured to replace, when it is determined that said power-up command is immediately preceded by a sequence of consecutive power-up commands, said power-up command with a power-down command;
 wherein said device is configured to maintain a power-down command that is immediately preceded by a sequence of consecutive power-down commands, where said sequence of consecutive power-down commands is at least as long as said sequence of consecutive power-up commands; and
 wherein said device is an asymmetric filter configured to limit the length of sequences of consecutive power-up commands while enabling longer resulting sequences of consecutive power-down commands.

10. The device of claim 9, wherein the sequence of consecutive power-up commands is a sequence of a predetermined number N of consecutive power-up commands, where N is an integer equal to or greater than 2.

11. The device of claim 9, wherein said asymmetric filter is configured to operate as a power-up command sequence limiter in combination with a power-down command pass filter component.

12. The device of claim 9, wherein the power control commands including power-up and power-down commands are transmit power control, TPC, commands for uplink transmit power control.

13. The device of claim 9, wherein the power control commands including power-up and power-down commands control the transmit power of user equipment, UE, for Inner Loop Power Control, ILPC.

14. The device of claim 9, wherein the device comprises part of a base station.

15. The device of claim 9, wherein the device comprises part of a user equipment.

16. A non-transitory computer readable medium having stored therein a computer program product comprising a set of instructions that, when executed by a processing circuit of a user equipment or a base station for filtering a stream of power control commands including power-up and power-down commands for uplink transmit power control in a wireless communication system, configure the processing circuit to:
 determine whether a power-up command is immediately preceded by a sequence of consecutive power-up commands;
 replace, when it is determined that said power-up command is immediately preceded by a sequence of consecutive power-up commands, said power-up command with a power-down command;
 maintain a power-down command that is immediately preceded by a sequence of consecutive power-down commands, where said sequence of consecutive power-down commands is at least as long as said sequence of consecutive power-up commands; and
 wherein said filtering is asymmetric by limiting the length of sequences of consecutive power-up commands while enabling longer resulting sequences of consecutive power-down commands.

17. A filtering device configured for filtering a stream of transmit power control commands used for controlling uplink transmit power from a user equipment operating in a wireless communication network, said stream including a changing mix of power-up commands and power-down commands, and said filtering device comprising one or more processing circuits configured to:
 detect power-up commands in the stream that are immediately preceded by sequences of consecutive power-up commands having sequence lengths greater than a defined threshold;
 form a filtered stream for use in power control, by replacing each such detected power-up command with one or more power-down commands;
 maintain a power-down command that is immediately preceded by a sequence of consecutive power-down commands, where said sequence of consecutive power-down commands is at least as long as said sequence of consecutive power-up commands; and
 wherein said filtering is asymmetric by limiting the length of sequences of consecutive power-up commands while enabling longer resulting sequences of consecutive power-down commands.

* * * * *